Dec. 4, 1951                 G. M. LARSON                2,576,947
                              CREAM WHIPPER
                            Filed Feb. 1, 1947
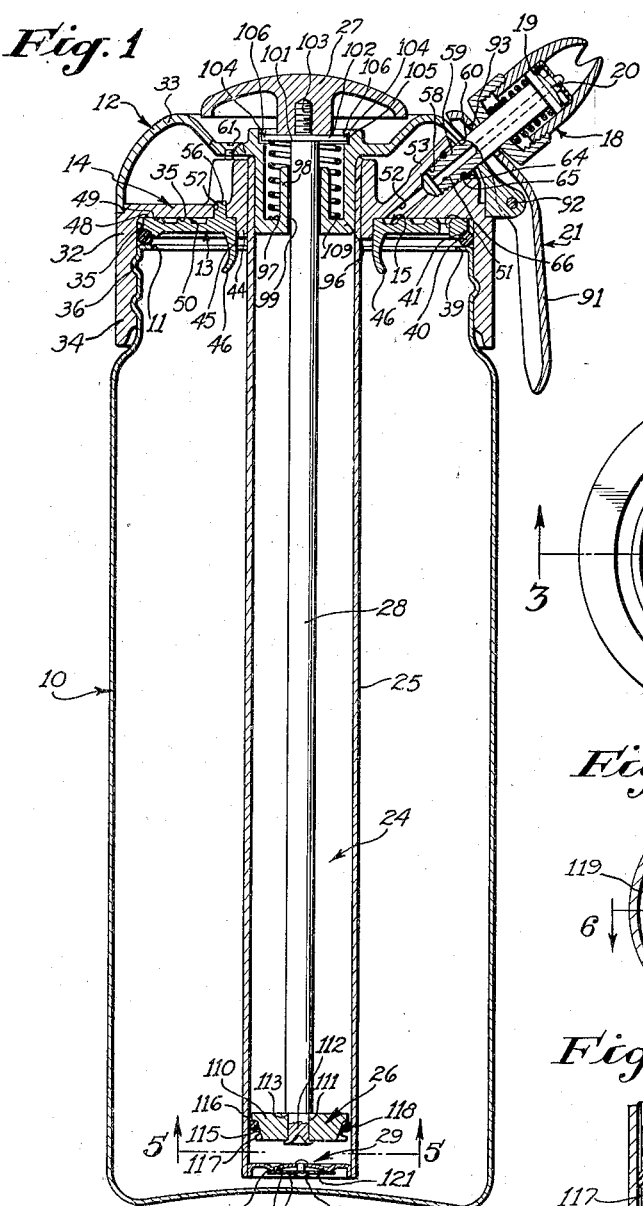
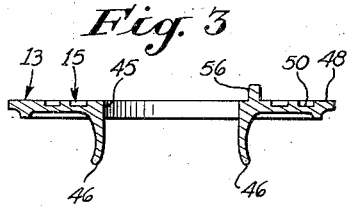
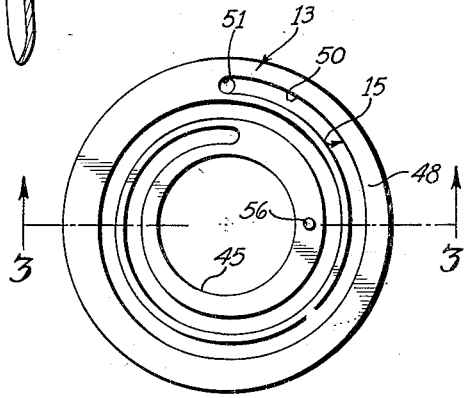
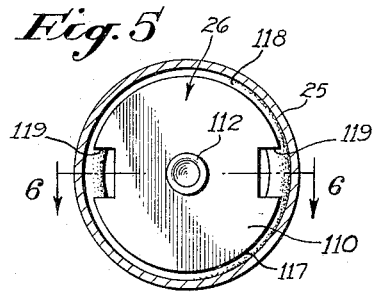
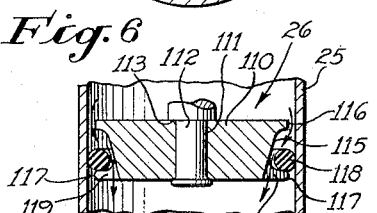
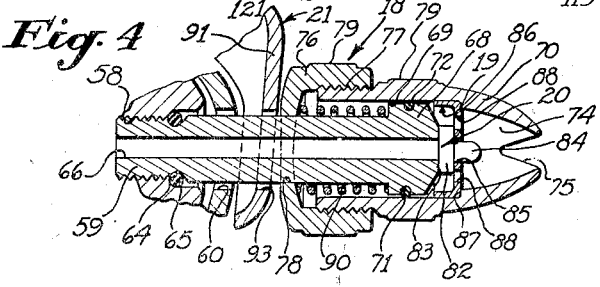
INVENTOR:
GLEN M. LARSON,
BY HIS ATTORNEYS
HARRIS, KIECH, FOSTER & HARRIS,
By Patented Dec. 4, 1951

2,576,947

UNITED STATES PATENT OFFICE 2,576,947

CREAM WHIPPER

Glen M. Larson, Los Angeles, Calif., assignor to Kurt H. Roy, Santa Cruz, Calif.

Application February 1, 1947, Serial No. 725,844

2 Claims. (Cl. 261—30)

My invention relates in general to devices for aerating liquids, and since the fundamental concepts involved are particularly applicable to and have been embodied in devices for producing whipped cream, I prefer to consider such an embodiment herein for convenience in disclosing the invention. Since my disclosure will enable those skilled in the art to embody the invention in devices for aerating liquids other than cream, it will be understood that my invention is not to be restricted to the particular embodiment and field of application considered herein.

The present aerating device is similar to and contains improvements on the aerating device which is disclosed in Patent No. 2,342,972, issued February 29, 1944, to Kurt H. Roy et al., and of which I am a co-inventor. The basic principles involved in whipping cream by aerating the cream with a gas are fully discussed in the patent and, consequently, will not be considered in detail herein. In general, my present invention utilizes the principle disclosed in the aforesaid patent that a liquid such as cream may be aerated to produce a foam-like, gas-liquid mixture such as whipped cream by forcing the liquid and gas under pressure and in intimate mutual contact through a relatively long processing passage of relatively small cross-sectional dimensions, and by discharging the intermixed gas and liquid from the processing passage into a processing chamber wherein the mixture is permitted to expand and is subjected to turbulence before being released from the device in final form.

In order to maintain the aerating device in a sanitary condition, it is essential that it be cleaned thoroughly after each use, particularly if the device is used only occasionally and is used for aerating such liquids as cream which may become rancid readily. A primary object of my invention, therefore, is to provide an aerating device of the foregoing general character whose components are all readily accessible so that they may be cleaned thoroughly with a minimum of effort.

An important object of the invention is to provide an aerating device having a processing passage of the character mentioned which lies between a pair of readily separable members so that the walls of the passage may be exposed by the simple expedient of separating the two members. Thus, the walls of the processing passage are readily accessible so that they may be cleaned easily to insure maintaining the aerating device in a sanitary condition.

In the preferred form of the invention, it is an object to provide an aerating device wherein at least a substantial portion of the processing passage is provided by a groove in a flat plate which is readily removable to expose the walls of the groove so that they may be cleaned easily. A related object is to provide an aerating device of this character wherein the grooved plate cooperates with a cap to provide a closure for a container which is adapted to confine the cream, or other liquid, and a gas under pressure.

Another object of my invention is to provide an aerating device which is portable, and which includes a manually operable pump for delivering air under pressure into the container. A related object is to provide such an aerating device wherein the pump includes an improved combination piston and intake valve.

Further objects of my invention include the provision of an aerating device which is of relatively simple construction, and which may be assembled and disassembled readily without exercising any great mechanical skill so that the device may be cleaned readily by the average user.

The foregoing objects and advantages of my invention, together with various other objects and advantages thereof which will be apparent hereinafter, may be realized by means of the exemplary embodiment which is illustrated in the accompanying drawing and which is described in detail hereinafter. Referring to the drawing:

Fig. 1 is a sectional view of an aerating device which embodies the fundamental principles of my invention;

Fig. 2 is a plan view of one component of the device;

Fig. 3 is a sectional view which is taken along the broken line 3—3 of Fig. 2;

Fig. 4 is an enlarged sectional view of one portion of the device;

Fig. 5 is an enlarged, fragmentary sectional view which is taken along the broken line 5—5 of Fig. 1; and Fig. 6 is a sectional view which is taken along the broken line 6—6 of Fig. 5.

Referring to the drawing, the embodiment of my invention illustrated therein is a portable, manually operable aerating device which is particularly adapted for use either in the home or commercially to whip cream or other liquids in relatively small quantities. In the event that larger quantities are required for commercial use, my invention may be embodied in larger aerating devices which may be stationary and which may be operable by other than manual means if desired. For convenience in describing the invention, I shall limit my disclosure to a consideration of the portable, manually operable device illustrated with the knowledge that my disclosure will readily enable those skilled in the art to practice the invention in other forms.

Referring particularly to Fig. 1, the aerating device illustrated includes a portable container 10 which is adapted to confine cream, or other liquid, and a gas such as air under pressure, the container having an open end 11 and being provided with a closure means, illustrated as a cap assembly 12, for the open end thereof to provide a fluid-tight construction. The cap assembly 12 includes inner and outer closure or passage forming members 13 and 14 which cooperate to provide a discharge or processing passage 15 therebetween, the members being separable so that the passage may be cleaned readily.

The processing passage 15 communicates with the interior of the container 10 and terminates at its discharge end in a nozzle assembly 18 which is adapted to provide a processing chamber 19, the nozzle assembly, which is mounted on the cap assembly 12, being provided with valve means 20 for controlling flow of fluid from the container through the processing passage. The aerating device includes manually operable means 21 for actuating the valve means 20 in the construction illustrated.

A manually operable pump 24 is mounted on the cap assembly 12 and is adapted to deliver air under pressure into the container 10, the pump including a cylinder or barrel 25 which is secured to the cap assembly. A piston assembly 26 is slidably disposed in the barrel 25 and is operable manually by a handle 27 which is connected thereto by a rod 28, the piston assembly being adapted to deliver air under pressure through a check valve 29 which prevents flow of fluid from the container 10 back into the pump barrel. The piston assembly 26, which is adapted to operate both as a piston and as an intake valve for the pump 24 is disclosed in the application Serial No. 571,909, of Howard B. Lewis, et al., filed January 8, 1945, now Patent No. 2,539,846, dated Jan. 30, 1951, for Venom Extractor, in which I am a co-inventor, and forms no part of the present invention.

Considering the structure of the aerating device in more detail, the passage forming member 13 is preferably a disc or plate which spans the open end of the container 10, and the passage forming member 14 is preferably a cap which is suitably connected to the container 10 and which is adapted to retain the plate in the proper position on the container. As shown in Fig. 1, the cap 14 is preferably formed in two sections 32 and 33 for convenience in manufacture, the lower section 32 being provided with a depending annular flange 34 which fits over the open end 11 of the container 10 and provides a recess 35 for the plate 13. The flange 34 on the cap 14 is preferably threaded on the container 10 as indicated at 36 so that it may be installed or removed readily.

As shown in Fig. 1, the container 10 is provided with an inwardly extending annular flange or lip 39 at its open end 11 which serves as a seat for an annular sealing element or ring 40, the sealing ring being disposed in an annular recess 41 in the plate 13 and being in engagement with the annular flange 34 on the cap 14 to provide a fluid-tight seal between the container, the plate and the cap. The lower section 32 of the cap 14 is provided with a central tubular portion 44 which extends into a central opening 45 in the plate 13 to center the plate in the recess 35 therefor in the cap. For convenience in removing the plate 13 from the recess 35, it is provided with a pair of tabs 46 which are preferably deformed outwardly as illustrated so that they may be grasped readily with the fingers.

As shown in Fig. 1, the plate 13 and cap 14 are provided with contacting surfaces 48 and 49, respectively, which are plane in the preferred form of our invention, the surface 48 being the upper surface of the plate, as viewed in Fig. 1, and the surface 49 being the base wall of the recess 35 in the cap. As best shown in Fig. 2, the surface 48 of the plate 13 is provided with a groove 50 therein which forms part of the processing passage 15, the groove preferably being of spiral form to provide a passage of the desired length, although the groove may be of other than spiral form if desired. It will be apparent that whenever it is necessary to clean the groove 50, the plate 13 may be removed readily so that the groove is exposed to facilitate cleaning thereof.

The plate 13 is provided with a bore 51 therethrough which intersects one end of the spiral groove 50 to provide communication between the groove and the interior of the container 10, communication between the groove and the exterior of the container being provided by a bore 52 which intersects the other end of the groove and extends through a boss 53 on the lower section 32 of the cap 14. As best shown in Fig. 1, the plate 13 is provided with a projection 56 thereon which is disposed in an opening 57 in the lower section 32 of the cap 14, the positions of the projection and the opening therefor being such that the bore 52 is properly positioned with respect to the groove 50. Thus, when the plate 13 is reassembled with the cap 14 after having been removed for the purpose of cleaning the groove 50, the projection 56 must be inserted in the opening 57, thereby insuring that the bore 52 will be properly positioned relative to the groove 50.

The boss 53 on the lower section 32 of the cap 14 is provided with a counterbore 58 therein which is concentric with respect to the bore 52 and communicates therewith. A tubular member or stem 59 is threaded into the counterbore 58 and extends through an opening 60 in the upper section 33 of the cap 14, the upper section of the cap substantially enclosing the lower section 32 thereof and being secured thereto by a screw 61. The stem 59 is provided with an annular groove 64 therein for an annular sealing element 65 which provides a fluid-tight seal between the stem and the lower section 32 of the cap 14, and is provided with a longitudinal bore 66 therethrough which forms part of the processing passage 15 and terminates in the processing chamber 19.

The stem 59, which supports the nozzle assembly 18, is provided with a head 68 thereon which is disposed in a bore 69 in a nozzle 70, the head being provided with an annular groove 71 therein for a sealing ring 72 which provides a fluid-tight seal between the nozzle and the stem. The nozzle 70 is provided with a discharge aperture 74 which may be serrated as indicated at 75, if desired, as is common practice in nozzles for use in decorating pastries. A cup-shaped member or ferrule 76 is threadedly connected to the nozzle 70 as indicated at 77 and is provided with a bore 78 therethrough for the stem 59, the nozzle and ferrule preferably being knurled, as indicated at 79, for convenience in assembly and disassembly thereof.

The valve means 20 includes a valve 82 which is preferably formed of rubber or the like and which is adapted to seat against the outer end 83 of the stem 59 to seal the processing passage 15, the valve having a stem 84 which is pressed into an opening 85 in a valve retainer 86. The valve retainer is disposed in the bore 69 in the nozzle 70 and is seated against a shoulder 87 formed at the junction of the bore 69 and the discharge aperture 74. The retainer 86 cooperates with the outer end 83 of the stem 59 to provide the processing chamber 19, and is provided with a plurality of openings 88 therethrough which communicate with the discharge aperture 74 in the nozzle 70.

In order to permit flow of fluid into the processing chamber 19 from the passage 15, the nozzle 70 and ferrule 76 are movable axially of the stem 59 so that the valve 82 may be unseated, the volume of the processing chamber 19 being increased as the valve is moved away from the outer end of the stem 59. The valve 82 is normally held against the outer end 83 of the stem 59 to prevent flow of fluid through the processing passage 15 by a compression spring 90 which is seated against the head 68 on the stem 59 and against the ferrule 76.

The manually operable means 21 for actuating the valve means 20 includes a handle or trigger 91 which is pivotally connected to the upper section 33 of the cap 14 at 92, and which engages the ferrule 76, the trigger having an opening 93 therethrough for the stem 59. It will be apparent that whenever discharge of whipped cream or other mixture from the device is desired, it is merely necessary to squeeze the trigger 91, whereupon it moves the ferrule 76 and nozzle 70 axially of the stem 59 to unseat the valve 82. When the trigger 91 is released, the spring 90 returns the ferrule 76 and nozzle 70 to the positions illustrated so as to re-seat the valve 82.

Considering the structure of the pump 24 in more detail, the upper end of the barrel 25 is pressed into the tubular central portion 44 of the lower section 32 of the cap 14, the upper section 33 thereof having a cylindrical projection 96 thereon which is pressed into the upper end of the barrel so that the barrel is securely attached to the cap. The cylindrical projection 96 is provided with an annular recess 97 which defines a central boss 98, the latter having a bore 99 therethrough for the piston rod 28. The diameter of the bore 99 is preferably somewhat greater than that of the rod 28 to provide an intake port for the pump barrel 25.

The piston rod 28 is provided with a shoulder 101 at one end thereof for a latch 102 which is retained by the handle 27 and is adapted to latch the handle in the position shown, the handle being threadedly connected to the rod as indicated at 103. The latch 102 is provided with ears 104 which are movable into or from an annular groove 105 in the upper section 33 of the cap 14 through slots 106 therein. In order to latch the handle 27 in the position illustrated, it is merely necessary to move it downwardly, as viewed in Fig. 1, so that the ears 104 on the latch 102 enter the annular groove 105 through the slots 106, and then rotate it so that the ears are out of alignment with the slots. A spring 109 is disposed in the annular recess 97 and is seated against the latch 102 so that it urges the ears 104 on the latch into engagement with the upper wall of the annular groove 105 to retain the handle 27 in the latched position. The spring 109 also serves as a cushion by opposing downward movement of the handle 27 as the piston assembly 26 reaches the lower end of its stroke as viewed in Fig. 1.

The piston assembly 26 includes a piston 110 which is provided with a bore 111 therethrough for a reduced end portion 112 of the rod 28, the reduced end portion of the rod cooperating with the remainder thereof to provide a shoulder 113 which serves as a seat for the piston. The piston 110 may be secured to the rod 28 in any suitable manner, as by peening the end of the reduced portion 112 of the rod, for example.

As best shown in Fig. 6, the piston 110 is provided with an annular groove 115 therein of a depth which increases longitudinally of the piston from the intake end of the pump barrel 25 to the outlet end thereof, the intake and outlet ends of the barrel being the upper and lower ends thereof, respectively, as viewed in the drawing. The annular groove 115 in the piston 110 provides an annular flange 116 adjacent the shallowest portion thereof, and provides another flange 117 adjacent the deepest portion thereof. An annular sealing element or ring 118 is disposed in the groove 115 and engages the pump barrel 25 to provide a fluid-tight seal between the piston 110 and the pump barrel when it is in the shallowest portion of the groove and is seated against the flange 116 on the piston, the outer diameter of the ring preferably being slightly greater than the diameter of the pump barrel so that friction between the barrel and the ring tends to restrain the ring during movement of the piston. The thickness of the sealing ring 118 is preferably such that the ring is wedged between the base wall of the groove 115 and the pump barrel 25 slightly when the ring is in the shallowest portion of the groove so as to insure a fluid-tight seal. However, when the sealing ring 118 is disposed in the deepest portion of the groove 115 and is seated against the flange 117 on the piston 110, the inner periphery of the ring is out of engagement with the base wall of the groove, as best shown in Fig. 6, so that air may flow into the lower portion of the pump barrel 25 through the space between the ring and the base of the groove as indicated by the arrows in Fig. 6. As best shown in Fig. 5, the flange 117 on the piston 110 is provided with notches 119 therein through which the air may flow when the sealing ring 118 is in the deepest portion of the groove 115 as shown in Fig. 6.

During downward movement of the piston 110, as viewed in the drawing, friction between the sealing ring 118 and the pump barrel 25, and the higher air pressure below the piston, cause the sealing ring to move into the shallowest portion of the groove 115 and seat against the flange 116, thus providing an air-tight seal as previously described so that the air in the barrel below the piston is forced into the container 10 through the check valve 29. Similarly, during upward movement of the piston 110, as viewed in the drawing, the friction between the sealing ring 118 and the pump barrel 25, and the higher air pressure above the piston, cause the sealing ring to move into the deepest portion of the groove 115 so that air may flow through the space between the base wall of the groove and the sealing ring and then through the notches 119 into the lower portion of the pump barrel. Thus, the sealing ring 118 acts as an intake valve which is closed during the compression or working stroke of the piston 110, and which is open during the intake stroke thereof.

The check valve 29 includes a valve seat 120 which is secured to the outlet end of the pump barrel 25 and which is provided with a plurality of openings 121 therethrough. A valve 122 of a flexible material such as rubber or the like is secured to the valve seat 120 by a pin 123, and is adapted to engage the valve seat to prevent flow of fluid from the container 10 back into the pump barrel 25. As is well known in the art, the fluid in the container 10 holds the valve 122 against the valve seat 120 when the pressure thereof is higher than the air pressure in the pump barrel 25. However, when the air pressure in the pump barrel 25 exceeds the pressure of the fluid in the container during the working stroke of the piston 110, the valve 122 yields to admit the air into the container through the openings 121 in the valve seat 120.

Considering the operation of my aerating device, it will be apparent that the cap assembly 12 may be removed readily so that the desired amount of cream, or other liquid, may be poured into the container 10. The cap assembly 12 is then replaced and is tightened to an extent such that the pressure on the sealing ring 40 is sufficient to provide a fluid-tight seal. Air is then pumped into the container 10 by reciprocating the piston assembly 26 until the desired pressure is attained, this pressure preferably being of the order of magnitude of 20 or 30 pounds per square inch, although other pressures may be employed if desired.

It will be noted that during the pumping operation, the spring 90 holds the valve 82 against the outer end 83 of the step 59 so that fluid will not escape from the container 10. The force exerted by the spring 90 is preferably such that it will permit the valve 82 to unseat in the event that the pumping operation is prolonged until an undesirably high pressure is reached. Thus, the spring 90 may be employed to permit the valve 82 to act as a safety device for preventing the attainment of excessive pressures.

After the desired pressure in the container 10 has been attained, the operator preferably shakes the device for a few seconds to produce a general intermixing of the air and cream, inverts the device so that the cream descends toward the inlet end of the processing passage 15, and then presses the trigger 91 to unseat the valve 82, thereby forming the processing chamber 19 between the valve and the outer end 83 of the stem 59. The intermixed air and cream flows through the processing passage 15 and issues from the discharge end thereof in the form of a jet which impinges upon the valve 82 and is deflected thereby with considerable turbulence before escaping through the openings 88 and the discharge aperture 74.

It will be apparent that the stiffness of the whipped cream may be varied by varying the distance which the valve 82 is displaced from the outer end 83 of the stem 59, thereby varying the rate of flow of the fluid mixture through the processing passage 15. For example, if the valve 82 is opened only enough to permit a relatively slow seepage of the cream through the processing passage 15, substantially no aerification thereof will result and the cream will be discharged in liquid form.

As discussed in more detail in the aforesaid Patent No. 2,342,972, the length of the processing passage 15 is preferably relatively large as compared to the cross-sectional dimensions thereof to provide aerated products of the desired consistency. In general, if the length of the processing passage 15 is too small relative to the cross-sectional dimensions thereof, the aerated product will not be sufficiently stiff, and if the length thereof is too large, the rate of production will be curtailed.

It will be apparent that the aerating device may be cleaned readily after use, removal of the cap assembly 12 making the interior of the container 10 and the exposed portions of the pump 24 readily accessible so that they may be cleaned thoroughly. The plate 13 may be removed readily by grasping the tabs 46 and withdrawing it from the recess 35 in the cap 14, thereby making the surfaces 48 and 49 and the groove 50 accessible for cleaning. The interior of the nozzle 70 and the valve 82 can be cleaned by disconnecting the nozzle from the ferrule 76, and the bores 52 and 66, being straight, may be cleaned readily with a suitable brush or the like (not shown). Thus, by removing only a few components of the aerating device, the entire device may be cleaned thoroughly to insure that it will be sanitary when next used, no particular skill being required for removing and reinstalling the components mentioned.

Although I have described a specific embodiment of my invention which is particularly adapted for aerating such liquids as cream, I do not intend to be limited to the specific disclosures contained herein since the embodiment disclosed is susceptible to other uses and various changes, modifications and substitutions may be incorporated therein without departing from the spirit of the invention. Consequently, I hereby reserve the right to all such changes, modifications and substitutions as properly come within the scope of my invention as defined by the appended claims.

I claim as my invention:

1. In a portable device of the character described for aerating a liquid, the combination of: a container having an open end; a plate spanning said open end of said container and having a plane surface which is provided with a spiral groove therein, said plate having an opening therethrough which communicates with one end of said spiral groove and with the interior of said container; a cap threaded on said open end of said container and having a plane surface which contacts said grooved surface of said plate, said cap having an opening therethrough which communicates with the other end of said spiral groove and with the exterior of said container, said groove in said plate and said openings through said plate and said cap cooperating to provide a processing passage; means providing a gas-tight seal at said open end of said container; manually operable means communicating with the interior of said container for pumping gas thereinto; valve means on said cap for regulating flow of intermixed gas and liquid through said processing passage; and manually operable means for operating said valve means.

2. In a device of the character described the combination of: a container provided with an opening; closure means for said opening adapted to be detachably connected to said container, said closure means comprising an inner closure member which is adapted to span said opening and comprising an outer closure member which is adapted to retain said inner closure member and which is adapted to be detachably connected to said container, said closure members being separable and being provided with contacting surfaces one of which has a groove therein, said closure members having holes therethrough which respectively communicate with opposite ends of said groove and which cooperate therewith to provide a processing passage; and means adapted to engage said container and said inner and outer closure members for providing a fluid-tight seal therebetween.

GLEN M. LARSON.

REFERENCES CITED

The following references are of record in the file of this patent:

UNITED STATES PATENTS

| Number | Name | Date |
|---|---|---|
| 733,228 | Logan | July 7, 1903 |
| 1,573,690 | Edwards | Feb. 16, 1926 |
| 1,984,617 | Williams | Dec. 18, 1934 |
| 2,074,597 | Stark | Mar. 23, 1937 |
| 2,342,972 | Roy et al. | Feb. 29, 1944 |